United States Patent

Saling et al.

[11] Patent Number: 5,910,578
[45] Date of Patent: Jun. 8, 1999

[54] PHENYLAZOANILINES

[75] Inventors: Peter Saling, Neustadt; Erhard Klahr, Ludwigshafen; Helmut Reichelt, Neustadt; Sabine Gruettner-Merten, Bensheim, all of Germany

[73] Assignee: BASF Aktiengesellschaft, Ludwigshafen, Germany

[21] Appl. No.: 09/115,699

[22] Filed: Jul. 15, 1998

[30] Foreign Application Priority Data

Jul. 15, 1997 [DE] Germany .............. 197 30 168

[51] Int. Cl.⁶ ............... C09B 29/01; C09B 29/085; D06P 1/18
[52] U.S. Cl. ............... 534/850; 534/854; 558/424; 560/252; 564/430; 564/441; 8/922
[58] Field of Search ............. 534/850, 854; 8/922

[56] References Cited

U.S. PATENT DOCUMENTS

| | | | |
|---|---|---|---|
| 3,522,234 | 7/1970 | Grobke | 534/854 |
| 3,632,801 | 1/1972 | Grobke | 534/854 |
| 4,540,815 | 9/1985 | Papenfuhs et al. | 564/216 |
| 4,941,997 | 7/1990 | Decher et al. | 534/856 X |
| 5,068,318 | 11/1991 | Decher et al. | 534/856 X |
| 5,107,022 | 4/1992 | De Besset | 564/223 |
| 5,569,751 | 10/1996 | Buhler | 534/850 |

FOREIGN PATENT DOCUMENTS

| | | |
|---|---|---|
| 0 011 048 1 | 5/1980 | European Pat. Off. . |
| 0 142 788 1 | 5/1985 | European Pat. Off. . |
| 0 299 921 1 | 1/1989 | European Pat. Off. . |
| 0 399 473 1 | 11/1990 | European Pat. Off. . |

OTHER PUBLICATIONS

Hans Berbalk, et al, "P–(5–Fluor–2,4–Dinitro–1–Phenylazo)–N, N–Dimethylanilin, Ein Neues Reagens Zur Flüssigchromatographischen Bestimmung Von Phenolen", Monatshefte Für Chemie. vol. 111, No. 1, Jan./Feb. 1980, pp. 529–533.

Primary Examiner—Fiona T. Powers
Attorney, Agent, or Firm—Oblon, Spivak, McClelland, Maier, & Neustadt, P.C.

[57] ABSTRACT

Azo dyes of the formula

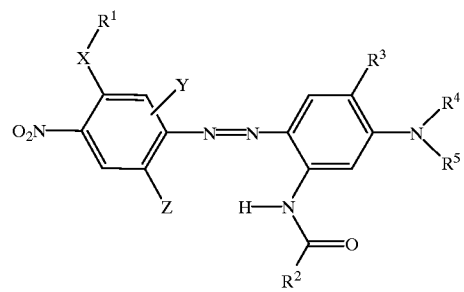

where

X is oxygen or a radical of the formula $NR^6$, where $R^6$ is hydrogen or substituted or unsubstituted $C_1$–$C_{13}$-alkyl, $R^1$ is substituted or unsubstituted $C_1$–$C_{13}$-alkyl or substituted or unsubstituted phenyl, Y is hydrogen, halogen or cyano, Z is nitro or additionally cyano when Y is halogen or cyano, $R^2$ is $C_1$–$C_4$-alkyl, methoxymethyl or substituted or unsubstituted phenyl, $R^3$ is hydrogen, $C_1$–$C_4$-alkoxy or $C_1$–$C_4$-alkyl, and $R^4$ and $R^5$ are each substituted or unsubstituted $C_2$–$C_{13}$-alkyl or $C_2$–$C_6$-alkenyl, are useful for dyeing or printing synthetic materials and are synthesizable using novel dinitroaminoaromatics as diazo components.

10 Claims, No Drawings

PHENYLAZOANILINES

The present invention relates to novel azo dyes of the formula I

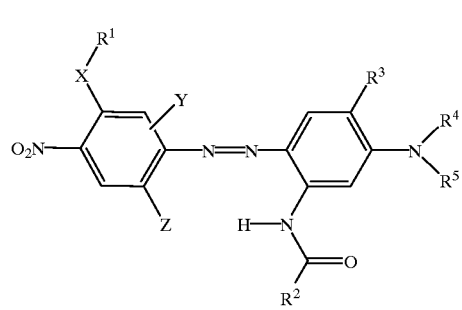

(I)

where
- X is oxygen or a radical of the formula $NR^6$, where $R^6$ is hydrogen or $C_1-C_{13}$-alkyl with or without interruption by from 1 to 4 oxygen atoms in ether function and with or without hydroxyl or $C_1-C_4$-alkanoyloxy substitution,
- $R^1$ is $C_1-C_{13}$-alkyl with or without interruption by from 1 to 4 oxygen atoms in ether function and with or without hydroxyl, $C_1-C_4$-alkanoyloxy or halogen-substituted $C_1-C_4$-alkanoyloxy substitution, or is substituted or unsubstituted phenyl,
- Y is hydrogen, halogen or cyano,
- Z is nitro or additionally cyano when Y is halogen or cyano,
- $R^2$ is $C_1-C_4$-alkyl, methoxymethyl or substituted or unsubstituted phenyl,
- $R^3$ is hydrogen, $C_1-C_4$-alkoxy or $C_1-C_4$-alkyl, and
- $R^4$ and $R^5$ are identical or different and are each independently of the other $C_2-C_{13}$-alkyl with or without interruption by from 1 to 4 oxygen atoms in ether function and with or without hydroxyl, $C_1-C_4$-alkanoyloxy or cyano substitution or $C_2-C_6$-alkenyl, to the use of dinitroaminoaromatics as diazo component, to dinitroaminoaromatics as intermediates in the synthesis of azo dyes and to the use of said azo dyes for dyeing or printing synthetic materials.

EP-A-299 921 and also Monatshefte für Chemie 111 (1980) 529–533, disclose azo dyes having a diazo component of the dinitroaniline series and a coupling component of the aniline series.

It is an object of the present invention to provide novel azo dyes having a diazo component of the dinitroaniline series and a coupling component of the aniline series which have an acylated amino group as a further substituent on the benzene ring of the coupling component. The novel azo dyes shall have advantageous application properties.

We have found that this object is achieved by the azo dyes of the formula I defined at the beginning.

Any alkyl or alkenyl appearing in the formulae mentioned hereinbefore and hereinafter may be straight-chain or branched.

Any substituted alkyl is generally monosubstituted or disubstituted.

Any alkyl interrupted by oxygen atoms in ether function is preferably alkyl interrupted by 1 or 2 oxygen atoms in ether function.

Any substituted phenyl may have as substituents, for example, $C_1-C_8$-alkyl, $C_1-C_8$-alkoxy, halogen, especially chlorine or bromine, nitro, cyano or $C_1-C_4$-alkoxycarbonyl. Substituted phenyl is generally monosubstituted, disubstituted or trisubstituted.

$R^1$, $R^2$, $R^3$, $R^4$, $R^5$, $R^6$ and $R^7$ are each for example methyl, ethyl, propyl, isopropyl, butyl, isobutyl, sec-butyl.

$R^1$, $R^4$, $R^5$, $R^6$ and $R^7$ may each also be for example pentyl, isopentyl, neopentyl, tert-pentyl, hexyl, 2-methylpentyl, heptyl, octyl, 2-ethylhexyl, isooctyl, nonyl, isononyl, decyl, isodecyl, undecyl, dodecyl, tridecyl, isotridecyl [The designations isooctyl, isononyl, isodecyl and isotridecyl are trivial names derived from the alcohols obtained by the oxo process (cf. Ullmann's Encyclopedia of Industrial Chemistry, 5th Edition, Vol. A 1, pages 290 to 293, and also Vol. A 10, pages 284 and 285).], 2-hydroxyethyl, 2-hydroxypropyl, 3-hydroxypropyl, 2-hydroxybutyl, 4-hydroxybutyl, 5-hydroxypentyl, 6-hydroxyhexyl, 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 2-acetyloxyethyl, 2-propionyloxyethyl, 2- or 3-acetyloxypropyl, 2- or 3-propionyloxypropyl, 2- or 4-acetyloxybutyl, 2- or 4-propionyloxybutyl.

$R^1$ and $R^7$ may also be for example 2-trifluoroacetyloxyethyl, 2- or 3-trifluoroacetyloxypropyl or 2- or 4-trifluoroacetyloxybutyl.

$R^4$ and $R^5$ may also be for example cyanomethyl, 2-cyanoethyl, 3-cyanopropyl, 2-cyanobutyl, 4-cyanobutyl, 5-cyanopentyl, 6-cyanohexyl, prop-2-en-1-yl, but-2-en-1-yl or 2-methylprop-2-en-1-yl.

$R^3$ may also be for example methoxy, ethoxy, propoxy, isopropoxy, butoxy, isobutoxy or sec-butoxy.

Preference is given to azo dyes of the formula I where Z is nitro and Y is hydrogen or halogen, especially hydrogen or bromine, hydrogen being particularly preferred.

Preference is likewise given to azo dyes of the formula I where Y and Z are both cyano.

Preference is also given to azo dyes of the formula I where X is oxygen or a radical of the formula $NR^6$ where $R^6$ is hydrogen or $C_4-C_8$-alkyl, especially to those azo dyes of the formula I where X is oxygen or NH.

Preference is further given to azo dyes of the formula I where $R^1$ is $C_4-C_8$-alkyl or phenyl, and especially to those azo dyes of the formula I where $R^1$ is $C_5-C_6$-alkyl, preferably $C_6$-alkyl.

Preference is further given to azo dyes of the formula I where $R^2$ is methyl or phenyl, preferably methyl.

Preference is also given to azo dyes of the formula I where $R^3$ is hydrogen, methoxy or ethoxy.

Preference is also given to azo dyes of the formula I where $R^4$ and $R^5$ are each $C_4-C_8$-alkyl, cyanoethyl or $C_3-C_4$-alkenyl, especially $C_5-C_6$-alkyl.

Preference is given as well to azo dyes of the formula I where the substituents are selected from a combination of the above-recited preferred substituents.

The present invention further provides for the use of dinitroaminoaromatics of the formula II

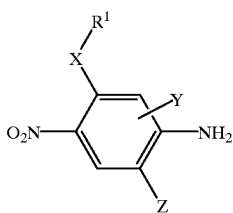

(II)

where $R^1$, X, Y and Z are each as defined above, as diazo component in the synthesis of azo dyes. In this process, the dinitroaminoaromatics of the formula II are diazotized in a conventional manner and then coupled with an aniline derivative of the formula III

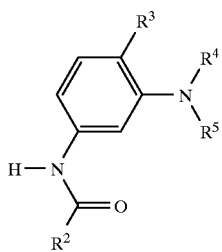

(III)

where $R^2$, $R^3$, $R^4$ and $R^5$ are each as defined above.

The anilines of the formula III, which, as well as the amino group, have an acylated amino group as further substituent on the benzene ring of the coupling component, are generally compounds known per se. They are described for example in EP-A-11 048, EP-A-142 788 or U.S. Pat. No. 5,107,022 or are obtainable by the methods mentioned therein.

The present invention further provides the dinitroaminoaromatic intermediates used in this process, which have the formula IIa

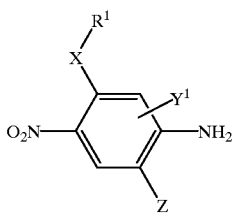

(IIa)

where
  X is oxygen or a radical of the formula $NR^6$, where $R^6$ is hydrogen or $C_1$–$C_{13}$-alkyl with or without interruption by from 1 to 4 oxygen atoms in ether function and with or without hydroxyl or $C_1$–$C_4$-alkanoyloxy substitution,
  $R^1$ is $C_1$–$C_{13}$-alkyl with or without interruption by from 1 to 4 oxygen atoms in ether function and with or without hydroxyl, $C_1$–$C_4$-alkanoyloxy or halogen-substituted $C_1$–$C_4$-alkanoyloxy substitution, or is substituted or unsubstituted phenyl,
  $Y^1$ is halogen or cyano, and
  Z is nitro or cyano.

Other valuable intermediates are those which have the formula IIb

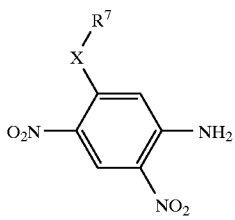

(IIb)

where
  X is oxygen or a radical of the formula $NR^6$, where $R^6$ is hydrogen or $C_1$–$C_{13}$-alkyl with or without interruption by from 1 to 4 oxygen atoms in ether function and with or without hydroxyl or $C_1$–$C_4$-alkanoyloxy substitution, and
  $R^7$ is $C_3$–$C_{11}$-alkyl with or without interruption by from 1 to 4 oxygen atoms in ether function and with or without hydroxyl, $C_1$–$C_4$-alkanoyloxy or halogen-substituted $C_1$–$C_4$-alkanoyloxy substitution.

The azo dyes of the formula I according to the invention are useful disperse dyes for dyeing or printing (including ink-jet printing) synthetic materials. Synthetic materials include for example polyesters, cellulose esters, polyamides or polycarbonates. Particularly suitable materials are materials in textile form, such as fibers, yarns, threads, knits, wovens or nonwovens composed of polyester, modified polyester, eg. anionically modified polyester, blend fabrics of polyester with cellulose, cotton, viscose or wool, or polyamide. The dyeing and printing conditions are known per se and include dyeing in supercritical carbon dioxide. The dyeings or prints obtained have high lightfastness, high brilliance and very good wetfastness properties, eg. very good wash or perspiration fastness.

The dyes of the invention are further suitable for use in a process wherein dyes-are transferred from a support to a polymer-coated support with the aid of an energy source by diffusion or sublimation.

The novel azo dyes can also be used for dyeing keratinous fibers, for example in hair dyeing or the dyeing of furs.

The azo dyes of the formula I according to the invention are further very useful for manufacturing color filters as described for example in EP-A-399 473.

Finally, they are also very useful as colorants for the manufacture of toners for electrophotography.

To obtain a favorable color buildup, it can be advantageous in some cases to use mixtures of the dyes of the formula I with each other for dyeing.

The novel azo dyes have bluish violet hues and good application properties, especially good wetfastness.

The Examples which follow illustrate the invention.

A) Preparation of Dinitroaminoaromatics of the Formula II

Example II.1:

1.7 g (0.075 mol) of sodium were introduced into 40 ml of n-propanol at room temperature. This was followed by heating to 60° C. and stirring for 1–2 h until all the sodium had dissolved. The resulting sodium n-propoxide was then added dropwise to a solution of 15.5 g (0.05 mol) of 5-chloro-2,4-dinitro-1-dimethylaminoformamidinoaniline in absolute tetrahydrofuran (THF) at 20–30° C. To complete the reaction, the batch was heated to 55–60° C. and subsequently stirred for 2 h. The THF was then distilled off under reduced pressure, the residue was admixed with 100 ml of N,N-dimethylformamide (DMF), and the DMF was distilled off in a rotary evaporator at a bath temperature of 85° C. This released the protective amidine group to afford the free aniline. The product was then added to a mixture of 1.5 l of ice-water, 5 ml of a crystallization aid based on an ethoxylated fatty alcohol and 30 ml of dilute hydrochloric acid. The solids were filtered off with suction, washed neutral with ice-water and then dried at 60° C. under reduced pressure, affording 7.5 g (62% yield) of product of the formula

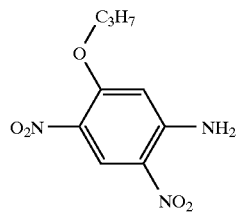

having a melting point of 179° C.

Example II.2:

1.7 g (0.075 mol) of sodium were introduced into 90 ml of isopropanol at room temperature. This was followed by heating to 60° C. and stirring for 1–2 h until all the sodium had dissolved. The resulting sodium isopropoxide was then added dropwise to a solution of 15.5 g (0.05 mol) of 5-chloro-2,4-dinitro-1-dimethylaminoformamidinoaniline in absolute THF at 20–30° C. To complete the reaction, the batch was heated to 55–60° C. and subsequently stirred for 2 h. The THF was then distilled off under reduced pressure, the residue was admixed with 100 ml of DMF, and the DMF was distilled off in a rotary evaporator at a bath temperature of 85° C. This released the protective amidine group to afford the free aniline. The product was then added to a mixture of 1.5 l of ice-water, 5 ml of a crystallization aid based on an ethoxylated fatty alcohol and 30 ml of dilute hydrochloric acid. The solids were filtered off with suction, washed neutral with ice-water and then dried at 60° C. under reduced pressure, affording 9.3 g (77% yield) of product of the formula

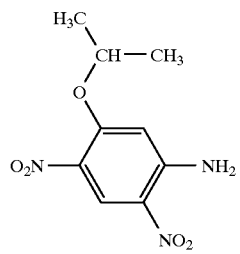

having a melting point of 114–117° C.

Example II.3:

1.7 g (0.075 mol) of sodium were introduced into 45 ml of butanol at room temperature. This was followed by heating to 60° C. and stirring for 1–2 h until all the sodium had dissolved. The resulting sodium butoxide was then added dropwise to a solution of 15.5 g (0.05 mol) of 5-chloro-2,4-dinitro-1-dimethylaminoformamidinoaniline in absolute THF at 20–30° C. To complete the reaction, the batch was heated to 55–60° C. and subsequently stirred for 2 h. The THF was then distilled off under reduced pressure, the residue was admixed with 100 ml of DMF, and the DMF was distilled off in a rotary evaporator at a bath temperature of 85° C. This released the protective amidine group to afford the free aniline. The product was then added to a mixture of 1.5 l of ice-water, 5 ml of a crystallization aid based on an ethoxylated fatty alcohol and 30 ml of dilute hydrochloric acid. The product was obtained as an oil. The oil was cooled to 0° C. and stirred at that temperature for 12 h. The solids were then filtered off with suction, washed neutral with ice-water and then dried at 60° C. under reduced pressure, affording 12 g (94% yield) of product of the formula

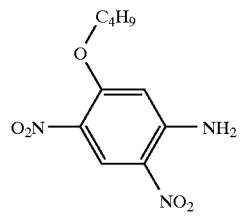

having a melting point of 119–123° C.

Example II.4:

1.7 g (0.075 mol) of sodium were introduced into 45 ml of n-hexanol at room temperature. This was followed by heating to 60° C., adding a further 40 ml of n-hexanol and stirring for 1–2 h until all the sodium had dissolved. The resulting sodium hexoxide was then added dropwise to a solution of 15.5 g (0.05 mol) of 5-chloro-2,4-dinitro-1-dimethylaminoformamidinoaniline in 100 ml of absolute THF at 20–30° C. To complete the reaction, the batch was heated to 45–50° C. and subsequently stirred for 2 h. The THF was then distilled off under reduced pressure, the residue was admixed with 100 ml of DMF, and the DMF was distilled off in a rotary evaporator at a bath temperature of 85° C. This released the protective amidine group to afford the free aniline. The product was then added to a mixture of 2.5 l of ice-water, 10 ml of a crystallization aid based on an ethoxylated fatty alcohol and 60 ml of dilute hydrochloric acid. The product was obtained as an oil. The oil was cooled to 0° C. and stirred at that temperature for 3 h. The product was filtered off with suction, washed neutral with ice-water and then dried at 60° C. under reduced pressure, affording 10.8 g (76% yield) of product of the formula

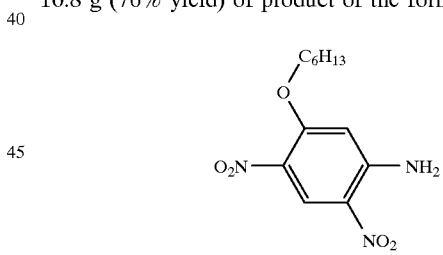

having a melting point of 98–102° C.

Example II.5:

25.6 g (0.06 mol) of butyllithium solution, 15% strength in hexane, were added to a solution of 7.6 g (0.075 mol) of 1-hexylamine in 100 ml of THF at 0° C. and stirred in at that temperature for 1 h. This solution was then added dropwise to a mixture of 5-chloro-2,4-dinitro-1-dimethylaminoformamidinoaniline in absolute THF at 20–25° C. and subsequently stirred in at that temperature for 2 h. This was followed by stirring at 55° C. for 2 h, whereupon 70 ml of DMF and 0.5 ml of dilute aqueous sodium hydroxide solution were added and the batch was stirred at room temperature for 12 h. This deprotected the aniline. The batch was subsequently concentrated under reduced pressure in a rotary evaporator, and the residue was added to a mixture of 300 ml of ice and 30 ml of dilute hydrochloric acid. The residue was taken up in methylene chloride, washed with water and dried with magnesium sulfate. The solvent was distilled off in a rotary evaporator, and the residue was subsequently dried at 60° C. under reduced pressure to afford 38 g (84%) of an oily product of the formula

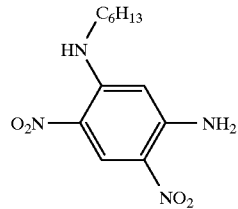

Example II.6:

A solution of 2.9 g (0.018 mol) of bromine in 25 ml of glacial acetic acid was added dropwise to a solution of 5.1 g (0.018 mol) of 5-hexyloxy-2,4-dinitro-1-aniline (Example 4) in 50 ml of glacial acetic acid at 65° C. over 2–3 h. On completion of the addition the batch was subsequently stirred at that temperature for 1 h. Thereafter the batch was cooled down to room temperature, the product was added to 300 ml of ice-water, and the mixture was subsequently stirred for 2 h until cold. The product was filtered off cold with suction, washed neutral with ice-water and subsequently dried at 50° C. under reduced pressure to afford 4.6 g (71% yield) of the desired product of the formula

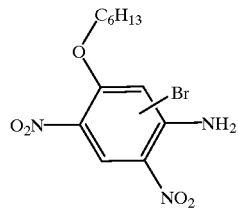

having a melting point of 85–87° C.

Example II.7:

2.6 g (0.11 mol) of sodium were introduced into 75 ml of 1,4-butanediol at room temperature. This was followed by heating to 60° C. and stirring for 1–2 h until all the sodium had dissolved. The resulting sodium monobutoxide was then added dropwise to a solution of 23.2 g (0.075 mol) of 5-chloro-2,4-dinitro-1-dimethylaminoformamidinoaniline in absolute THF at 20–30° C. To complete the reaction, the batch was heated to 55–60° C. and subsequently stirred for 2 h. The THF was then distilled off under reduced pressure, the residue was admixed with 100 ml of DMF, and the DMF was distilled off at a bath temperature of 85° C. in a rotary evaporator at a bath temperature of 65° C. This released the protective amidine group to afford the free aniline. The product was then added to a mixture of 2.0 l of ice-water, 5 ml of a crystallization aid based on an ethoxylated fatty alcohol and 45 ml of dilute hydrochloric acid. The solids were filtered off with suction, washed neutral with ice-water and then dried at 60° C. under reduced pressure, affording 19.2 g (94% yield) of product of the formula

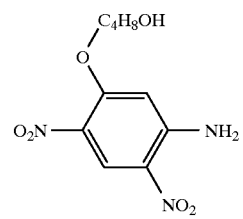

having a melting point of 92–112° C.

Example II.8:

1.7 g (0.075 mol) of sodium were introduced into 45 ml of butanol at room temperature. This was followed by heating to 60° C. and stirring for 1–2 h until all the sodium had dissolved. The resulting sodium butoxide was then added dropwise to a solution of 13.25 g (0.05 mol) of 5-chloro-4-nitro-1-dimethylaminoformamidinoaniline in 100 ml of absolute THF at 20–30° C. To complete the reaction, the batch was heated to 50° C., subsequently stirred at that temperature for 5 h and then neutralized with HCl. The THF was then distilled off under reduced pressure and the residue was admixed with 75 ml of glacial acetic acid. The resulting solution was admixed at 65° C. with a solution of 24 g (0.15 mol) of bromine in 50 ml of glacial acetic acid added dropwise over 2–3 h. On completion of the addition the batch was subsequently stirred at that temperature for 1 h. The mixture was then admixed with 125 g of water, subsequently stirred at 5° C. for 18 h and then added to 400 ml of ice-water. The precipitated product was filtered off with suction, washed with water and then dried under reduced pressure at 50° C. to afford 15.2 g (83% yield) of the desired product of the formula

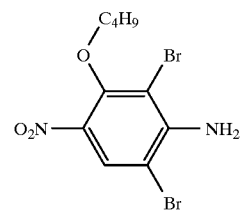

having a melting point of 79–83° C.

The dinitroaminoaromatics of the formula

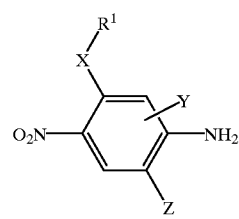

recited below in Table 1 are obtained in a similar manner.

TABLE 1

|  | X | Y | Z | $R^1$ |
|---|---|---|---|---|
| Example II.9 | O | H | $NO_2$ | $C_8H_{17}$ |
| Example II.10 | O | H | $NO_2$ | $C_6H_5$ |
| Example II.11 | O | Br | $NO_2$ | $C_4H_9$ |
| Example II.12 | O | Br | $NO_2$ | $C_8H_{17}$ |

TABLE 1-continued

|  | X | Y | Z | R¹ |
|---|---|---|---|---|
| Example II.13 | O | Br | NO$_2$ | C$_6$H$_{13}$ |
| Example II.14 | O | Br | NO$_2$ | C$_6$H$_5$ |
| Example II.15 | O | H | NO$_2$ | C$_2$H$_4$OH |
| Example II.16 | O | Br | NO$_2$ | C$_4$H$_8$OH |
| Example II.17 | O | Br | NO$_2$ | C$_2$H$_4$OH |

B) Preparation of Azo Dyes of the Formula I

Example I.1

4.9 g (0.015 mol) of nitrosylsulfuric acid were introduced into a suspension of 3.4 g (0.015 mol) of 2,4-dinitro-5-ethoxy-1-aniline and 60 ml of glacial acetic acid and 20 ml of propionic acid at 3° C. The mixture was subsequently stirred at 0–3° C. for 2 h to obtain the diazonium salt. This mixture was then added over 10 min to a solution consisting of 50 ml of dimethylformamide, 0.5 g of amidosulfuric acid, 50 g of ice, 0.5 g of a crystallization aid based on an ethoxylated fatty alcohol and 3.57 g (0.015 mol) of 1-acetylamino-3-N,N-diethylaminobenzene, while a further 200 g of ice were added to maintain the temperature at not more than 2° C. The mixture was subsequently stirred at 0–3° C. for 1 h, admixed with 20 g of sodium acetate at 2° C. and buffered to pH 4. The dye precipitated and was subsequently filtered off cold with suction, washed neutral with hot water and dried at 60° C. under reduced pressure to afford 4.3 g (65% yield) of dye of the formula

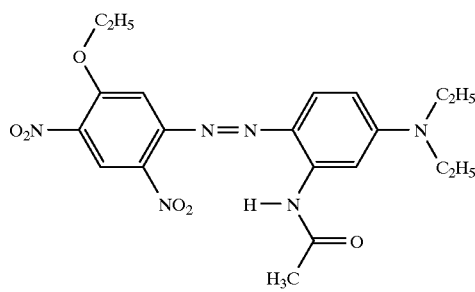

having a melting point of 143–145° C. and a $\lambda_{max}$ of 531 nm.

Example I.2

4.9 g (0.015 mol) of nitrosylsulfuric acid were added to a suspension of 3.62 g (0.015 mol) of 2,4-dinitro-5-propoxy-1-aniline (see Example II.1) and 60 ml of glacial acetic acid and 20 ml of propionic acid at 3° C. The mixture was subsequently stirred at 0–3° C. for 2 h to obtain the diazonium salt. This mixture was then added over 10 min to a solution consisting of 50 ml of dimethylformamide, 0.5 g of amidosulfuric acid, 50 g of ice, 0.5 g of a crystallization aid based on an ethoxylated fatty alcohol and 3.57 g (0.015 mol) of 1-acetylamino-3-N,N-diethylaminobenzene, while a further 150 g of ice were added to maintain the temperature at not more than 2° C. The mixture was subsequently stirred at 0–3° C. for 1 h. The precipitated dye was then filtered off cold with suction, washed neutral with hot water and dried at 60° C. under reduced pressure to afford 4.0 g (58% yield) of dye of the formula

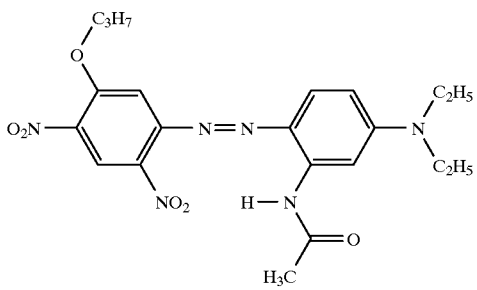

having a melting point of 160–164° C. and a $\lambda_{max}$ of 534 nm.

Example I.3

13.7 g (0.047 mol) of nitrosylsulfuric acid were added to a suspension of 15.1 g (0.047 mol) of 6-bromo-2,4-dinitro-5-hexyloxy-1-aniline (see Example II.13) in 210 ml of glacial acetic acid and 70 ml of propionic acid at 3° C. The mixture was subsequently stirred at 0–3° C. for 2 h to obtain the diazonium salt. This mixture was then added over 10 min to a solution consisting of 135 ml of dimethylformamide, 1.0 g of amidosulfuric acid, 150 g of ice, 1.0 g of a crystallization aid based on an ethoxylated fatty alcohol and 9.0 g (0.047 mol) of 1-acetylamino-3-N,N-diethylaminobenzene, while a further 300 g of ice were added to maintain the temperature at not more than 2° C. and 1.0 g of a crystallization aid based on a phosphoric ester was added. The mixture was subsequently stirred at 0–3° C. for 3 h. The precipitated dye was then filtered off cold with suction, washed neutral with cold water and dried at 60° C. under reduced pressure to afford 17.2 g (71% yield) of dye of the formula

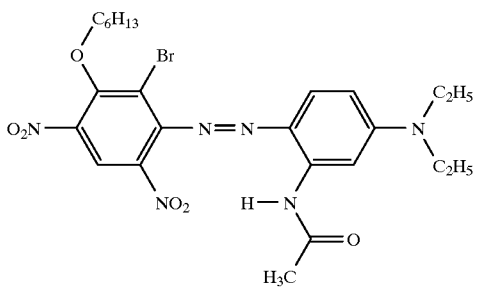

having a melting point of 106–109° C. and a $\lambda_{max}$ of 537 nm.

Example I.4

11.0 g (0.035 mol) of nitrosylsulfuric acid were added to a suspension of 9.9 g (0.035 mol) of 2,4-dinitro-5-hexyloxy-1-aniline in 60 ml of glacial acetic acid and 20 ml of propionic acid at 3° C. The mixture was subsequently stirred at 0–3° C. for 2 h to obtain the diazonium salt. This mixture was then added over 10 min to a solution consisting of 50 ml of dimethylformamide, 0.5 g of amidosulfuric acid, 50 g of ice and 0.5 g of a crystallization aid based on an ethoxylated fatty alcohol and 10.6 g (0.035 mol) of 1-benzoylamino-3-N,N-diethylaminobenzene. The mixture was subsequently stirred at 0–3° C. for 4 h. The precipitated dye was then filtered off with suction at room temperature, washed neutral with hot water and dried at 60° C. under reduced pressure to afford 9.2 g (39% yield) of dye of the formula

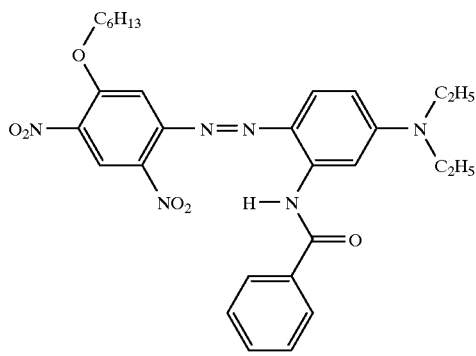

having a melting point of 117–120° C. and a $\lambda_{max}$ of 530 nm.

Example I.5

11 g (0.035 mol) of nitrosylsulfuric acid were added to a suspension of 9.9 g (0.035 mol) of 2,4-dinitro-5-butyloxy-1-aniline in 60 ml of glacial acetic acid and 20 ml of propionic acid at 3° C. The mixture was subsequently stirred at 0–3° C. for 2 h to obtain the diazonium salt. This mixture was then added over 10 min to a solution consisting of 50 ml of dimethylformamide, 0.5 g of amidosulfuric acid, 50 g of ice, 0.5 g of a crystallization aid based on an ethoxylated fatty alcohol and 10.6 g (0.035 mol) of 1-benzoylamino-3-N,N-dihexylaminobenzene. The mixture was subsequently stirred at 0–3° C. for 4 h. The precipitated dye was then filtered off with suction at room temperature, washed neutral with hot water and dried at 60° C. under reduced presure to afford 9.5 g (44% yield) of dye of the formula

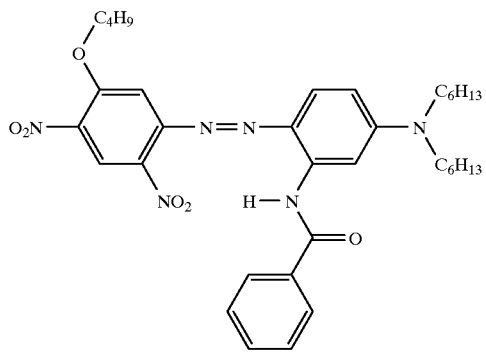

having a melting point of 160–164° C. and a $\lambda_{max}$ of 536 nm.

Example I.6

22.0 g (0.07 mol) of nitrosylsulfuric acid were added to a suspension of 19.0 g (0.07 mol) of 2,4-dinitro-5-hydroxybutyloxy-1-aniline in 225 ml of glacial acetic acid and 75 ml of propionic acid at 3° C. The mixture was subsequently stirred at 0–3° C. for 2 h to obtain the diazonium salt. This mixture was then added over 10 min to a solution consisting of 50 ml of dimethylformamide, 0.5 g of amidosulfuric acid, 50 g of ice, 0.5 g of a crystallization aid based on an ethoxylated fatty alcohol and 15.9 g (0.07 mol) of 1-acetylamino-3-N,N-diethylaminobenzene. The mixture was subsequently stirred at 0–3° C. for 4 h. To complete the coupling, 50 g of sodium acetate and ice were added to obtain a pH of 3–4. The mixture was subsequently stirred for 1 h, 100 ml of dilute hydrochloric acid were added, and then the precipitated dye was filtered off cold with suction, washed neutral with ice-water and dried at 60° C. under reduced pressure to afford 22 g (64% yield) of dye of the formula

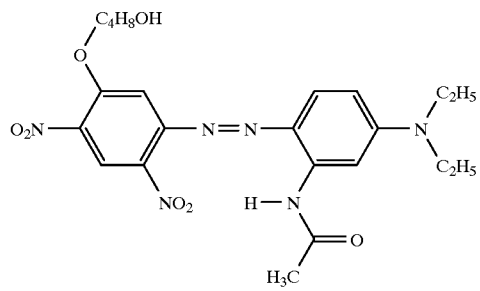

with a melting point of 80–86° C. and a $\lambda_{max}$ of 534 nm.

Example I.7

5.3 g (0.011 mol) of the dye of Example I.6 were suspended in 50 ml of acetic anhydride, and the suspension was heated to 70–80° C. and subsequently stirred for 3 h. 25 ml of water were then added a little at a time at that temperature, and the mixture was heated to 100° C. This was followed by stirring for 2 h, cooling down to 30–40° C. and subsequent addition of 400 ml of ice-water. The batch was stirred at 60° C. for 4 h, and then the precipitated dye was filtered off with suction, washed neutral with ice-water and dried at 60° C. under reduced pressure to afford 5.1 g (89% yield) of dye of the formula

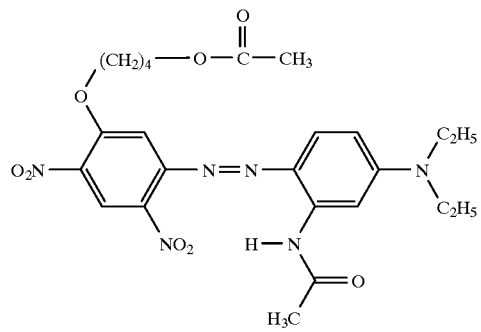

having a melting point of 78–86° C. and a $\lambda_{max}$ of 532 nm.

Example I.8

23.6 g (0.075 mol) of nitrosylsulfuric acid were added to a suspension of 25.9 g (0.075 mol) of 2,4-dinitro-5-hexyloxy-1-aniline in 280 ml of glacial acetic acid and 90 ml of propionic acid at 3° C. The mixture was subsequently stirred at 0–3° C. for 2 h to obtain the diazonium salt. This mixture was then added over 10 min to a solution consisting of 80 ml of dimethylformamide, 1.0 g of amidosulfuric acid, 100 g of ice, 0.5 g of a crystallization aid based on an ethoxylated fatty alcohol and 15.9 g (0.07 mol) of 1-acetylamino-3-N,N-di(ethyloxyacetyl)amino-4-ethoxybenzene. The mixture was subsequently stirred at 0–3° C. for 4 h. To complete the coupling, 50 g of sodium acetate and ice were added to obtain a pH of 3–4. The batch was subsequently stirred for 1 h, adjusted to pH 1.0 with 100 ml of dilute hydrochloric acid and stirred at 0° C. for 2 h, and then the precipitated dye was filtered off cold with suction, washed neutral with ice-water and dried at 60° C. under reduced pressure to afford 22 g (64% yield) of dye of the formula

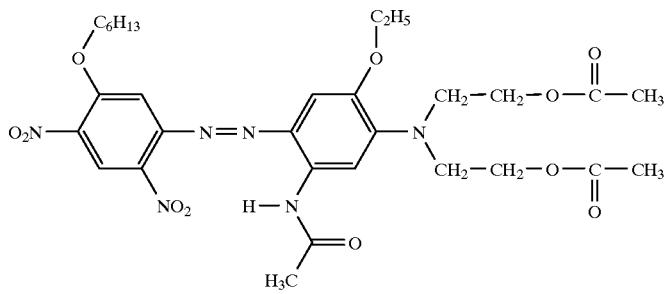

having a melting point of 107–109° C. and a $\lambda_{max}$ of 542 nm.

Example I.9

15.7 g (0.05 mol) of nitrosylsulfuric acid were added to a suspension of 15.0 g (0.05 mol) of 2,4-dinitro-5-hexyloxy-1-aniline in 280 ml of glacial acetic acid and 90 ml of propionic acid at 3° C. The mixture was subsequently stirred at 0–3° C. for 2 h to obtain the diazonium salt. This mixture was then added over 10 min to a solution consisting of 50 ml of dimethylformamide, 0.5 g of amidosulfuric acid, 50 g of ice, 0.5 g of a crystallization aid based on an ethoxylated fatty alcohol and 24.8 g (0.05 mol) of 1-acetylamino-3-(N-cyanoethyl-N-(but-2-enyl))amino-4-methoxybenzene. The mixture was subsequently stirred at 0–3° C. for 4 h. To complete the coupling, 50 g of sodium acetate and ice were added to obtain a pH of 3–4. The batch was subsequently stirred for 1 h, adjusted to a pH of 1.0 with 100 ml of dilute hydrochloric acid and stirred at 0° C. for 2 h, and then the precipitated dye was filtered off cold with suction, washed neutral with ice-water and dried at 60° C. under reduced pressure to afford 10.4 g (36% yield) of dye of the formula

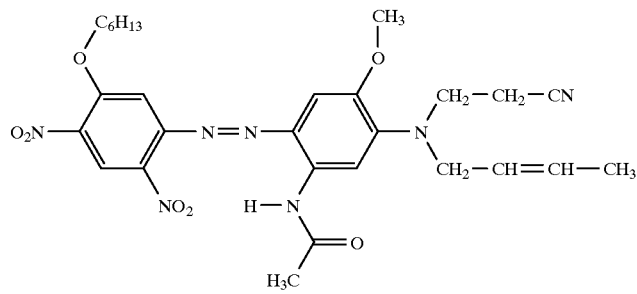

having a melting point of 142–144° C. and a $\lambda_{max}$ of 540 nm.

Example I.10

A solution of 3.68 g (0.01 mol) of 2,6-dibromo-4-nitro-5-butyloxy-1-aniline (see Example II.8) in a mixture of 24 ml of glacial acetic acid and 8 ml of propionic acid was admixed with 3.14 g (0.01 mol) of nitrosylsulfuric acid at 0–3° C. The mixture was subsequently stirred at that temperature for 1 h to obtain the diazonium salt. This mixture was then added over 10 min to a solution consisting of 30 ml of dimethylformamide, 0.5 g of amidosulfuric acid, 50 g of ice, 0.3 g of a crystallization aid based on an ethoxylated fatty alcohol and 2.27 g (0.01 mol) of 1-acetylamino-3-N,N-diethylaminobenzene. The mixture was subsequently stirred at 0–5° C. for 3 h. The precipitated dye was then filtered off cold with suction, washed neutral with cold water and dried at 60° C. under reduced pressure to afford 4 g (70% yield) of dye of the formula

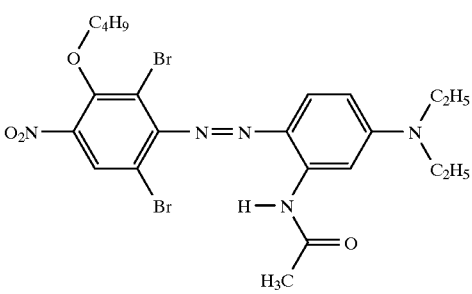

Example I.11

4 g (0.007 mol) of the product prepared in Example I.10 were admixed with 12 ml of dimethylformamide, 2.3 g of $Zn(CN)_2$ and 0.108 g of CuCN. The mixture was heated to 110° C. over 1 h with vigorous stirring and maintained at that temperature for 3 h. 12 ml of methanol and 4 ml of water were then added at 90° C., and the mixture was cooled down to room temperature. The solids were filtered off with suction, washed with 10 ml of methanol, 30 ml of 10% strength HCl and 100 ml of water and dried at 60° C. under reduced pressure to afford 3 g (92% yield) of dye of the formula

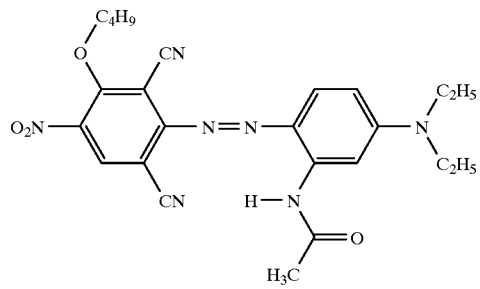

having a melting point of 74–77° C. and a $\lambda_{max}$ of 572 nm.

The azo dyes of the formula

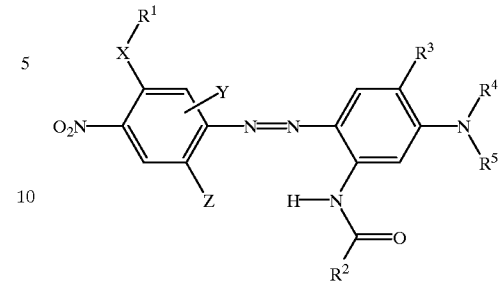

recited below in Tables 2a and 2b are obtained in a similar manner to the above examples.

TABLE 2a

| | X | Y | Z | $R^1$ | $R^2$ | $R^3$ | $R^4$ | $R^5$ | $\lambda_{max}$ [nm] |
|---|---|---|---|---|---|---|---|---|---|
| Example I.12 | O | H | $NO_2$ | $i$-$C_3H_7$ | $CH_3$ | H | $C_2H_5$ | $C_2H_5$ | 536 |
| Example I.13 | O | H | $NO_2$ | $C_4H_9$ | $CH_3$ | H | $C_2H_5$ | $C_2H_5$ | 532 |
| Example I.14 | O | H | $NO_2$ | $C_6H_{13}$ | $CH_3$ | H | $C_2H_5$ | $C_2H_5$ | 532 |
| Example I.15 | O | H | $NO_2$ | $C_8H_{17}$ | $CH_3$ | H | $C_2H_5$ | $C_2H_5$ | |
| Example I.16 | O | H | $NO_2$ | $C_6H_5$ | $CH_3$ | H | $C_2H_5$ | $C_2H_5$ | |
| Example I.17 | N | H | $NO_2$ | $C_6H_{13}$ | $CH_3$ | H | $C_2H_5$ | $C_2H_5$ | |
| Example I.18 | O | Br | $NO_2$ | $C_4H_9$ | $CH_3$ | H | $C_2H_5$ | $C_2H_5$ | 532 |
| Example I.19 | O | Br | $NO_2$ | $C_8H_{17}$ | $CH_3$ | H | $C_2H_5$ | $C_2H_5$ | |
| Example I.20 | O | Br | $NO_2$ | $C_6H_5$ | $CH_3$ | H | $C_2H_5$ | $C_2H_5$ | 540 |
| Example I.21 | O | Br | $NO_2$ | $C_6H_{13}$ | $CH_3$ | H | $C_2H_5$ | $C_2H_5$ | 538 |
| Example I.22 | O | Br | $NO_2$ | $C_4H_9$ | $C_6H_5$ | H | $C_2H_5$ | $C_2H_5$ | |
| Example I.23 | O | Br | $NO_2$ | $C_6H_{13}$ | $C_6H_5$ | H | $C_2H_5$ | $C_2H_5$ | |
| Example I.24 | O | Br | $NO_2$ | $C_6H_5$ | $C_6H_5$ | H | $C_2H_5$ | $C_2H_5$ | |
| Example I.25 | O | H | $NO_2$ | $C_4H_9$ | $C_6H_5$ | H | $C_2H_5$ | $C_2H_5$ | |
| Example I.26 | O | H | $NO_2$ | $C_6H_{13}$ | $C_6H_5$ | H | $C_6H_{13}$ | $C_6H_{13}$ | |
| Example I.27 | O | H | $NO_2$ | $C_4H_9$ | $CH_3$ | H | $C_4H_9$ | $C_4H_9$ | 529 |
| Example I.28 | O | H | $NO_2$ | $C_6H_{13}$ | $CH_3$ | H | $C_4H_9$ | $C_4H_9$ | 538 |
| Example I.29 | O | H | $NO_2$ | $C_6H_{13}$ | $CH_3$ | H | $C_6H_{13}$ | $C_6H_{13}$ | 536 |
| Example I.30 | O | Br | $NO_2$ | $C_4H_9$ | $CH_3$ | H | $C_6H_{13}$ | $C_6H_{13}$ | |

TABLE 2b

| | X | Y | Z | $R^1$ | $R^2$ | $R^3$ | $R^4$ | $R^5$ | $\lambda_{max}$ [nm] |
|---|---|---|---|---|---|---|---|---|---|
| Example I.31 | O | Br | $NO_2$ | $C_6H_{13}$ | $CH_3$ | H | $C_6H_{13}$ | $C_6H_{13}$ | 535 |
| Example I.32 | O | H | $NO_2$ | $C_2H_4OH$ | $CH_3$ | H | $C_2H_5$ | $C_2H_5$ | 532 |
| Example I.33 | O | H | $NO_2$ | $C_4H_8OH$ | $CH_3$ | H | $C_6H_{13}$ | $C_6H_{13}$ | |
| Example I.34 | O | H | $NO_2$ | $C_2H_4OH$ | $CH_3$ | H | $C_6H_{13}$ | $C_6H_{13}$ | |
| Example I.35 | O | H | $NO_2$ | $C_2H_4OCOCH_3$ | $CH_3$ | H | $C_2H_5$ | $C_2H_5$ | 535 |
| Example I.36 | O | H | $NO_2$ | $C_4H_8OCOCH_3$ | $CH_3$ | H | $C_6H_{13}$ | $C_6H_{13}$ | |
| Example I.37 | O | H | $NO_2$ | $C_2H_4OCOCH_3$ | $CH_3$ | H | $C_6H_{13}$ | $C_6H_{13}$ | |
| Example I.38 | O | H | $NO_2$ | $C_6H_{13}$ | $CH_3$ | $OC_2H_5$ | $C_6H_{13}$ | $C_6H_{13}$ | |
| Example I.39 | O | H | $NO_2$ | $C_4H_9$ | $CH_3$ | $OCH_3$ | $C_2H_4OCOCH_3$ | $C_2H_4OCOCH_3$ | 526 |
| Example I.40 | O | H | $NO_2$ | $C_6H_5$ | $CH_3$ | $OCH_3$ | $C_2H_4OH$ | $C_2H_4OH$ | 577 |
| Example I.41 | O | H | $NO_2$ | $C_6H_{13}$ | $CH_3$ | $OC_2H_5$ | $C_2H_3$=$CH_2$ | $C_2H_3$=$CH_2$ | 552 |
| Example I.42 | O | H | $NO_2$ | $C_6H_{13}$ | $CH_3$ | $OCH_3$ | $C_2H_4CN$ | $C_2H_3$=$CH_2$ | 536 |
| Example I.43 | O | H | $NO_2$ | $C_6H_5$ | $CH_3$ | $OCH_3$ | $C_2H_4CN$ | $C_2H_3$=$CH_2$ | 548 |
| Example I.44 | O | H | $NO_2$ | $C_4H_8OCOCH_3$ | $CH_3$ | $OC_2H_5$ | $C_2H_5$ | $C_2H_5$ | 574 |
| Example I.45 | O | H | $NO_2$ | $C_2H_4OCOCH_3$ | $CH_3$ | $OCH_3$ | $C_2H_4CN$ | $C_2H_3$=$CH_2$ | 535 |
| Example I.46 | O | H | $NO_2$ | $C_2H_4OCOCF_3$ | $CH_3$ | $OCH_3$ | $C_2H_4CN$ | $C_2H_3$=$CH_2$ | |
| Example I.47 | O | CN | CN | $C_2H_4OH$ | $CH_3$ | H | $C_2H_5$ | $C_2H_5$ | |
| Example I.48 | O | CN | CN | $C_2H_4OCOCH_3$ | $CH_3$ | H | $C_2H_5$ | $C_2H_5$ | |

German patent application 19730168.1 is incorporated herein by reference.

We claim:

1. An azo dye of the formula I

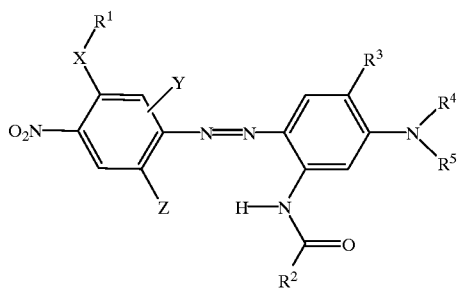

where
- X is oxygen or a radical of the formula $NR^6$, where $R^6$ is hydrogen or $C_1$–$C_{13}$-alkyl with or without interruption by from 1 to 4 oxygen atoms in ether function and with or without hydroxyl or $C_1$–$C_4$-alkanoyloxy substitution,
- $R^1$ is $C_1$–$C_{13}$-alkyl with or without interruption by from 1 to 4 oxygen atoms in ether function and with or without hydroxyl, $C_1$–$C_4$-alkanoyloxy or halogen-substituted $C_1$–$C_4$-alkanoyloxy substitution, or is substituted or unsubstituted phenyl,
- Y is hydrogen, halogen or cyano,
- Z is nitro or additionally cyano when Y is halogen or cyano,
- $R^2$ is $C_1$–$C_4$-alkyl, methoxymethyl or substituted or unsubstituted phenyl,
- $R^3$ is hydrogen, $C_1$–$C_4$-alkoxy or $C_1$–$C_4$-alkyl, and
- $R^4$ and $R^5$ are identical or different and are each independently of the other $C_2$–$C_{13}$-alkyl with or without interruption by from 1 to 4 oxygen atoms in ether function and with or without hydroxyl, $C_1$–$C_4$-alkanoyloxy or cyano substitution or $C_2$–$C_6$-alkenyl.

2. The azo dye as claimed in claim 1, wherein Y is hydrogen or halogen and Z is nitro.

3. The azo dye as claimed in claim 2, wherein Y is hydrogen.

4. The azo dye as claimed in claim 1, wherein Y and Z are both cyano.

5. The azo dye as claimed in claim 1, wherein X is oxygen or a radical of the formula $NR^6$, where $R^6$ is hydrogen or $C_4$–$C_8$-alkyl.

6. The azo dye as claimed in claim 1, wherein $R^1$ is $C_4$–$C_8$-alkyl or phenyl.

7. The azo dye as claimed in claim 1, wherein $R^2$ is methyl or phenyl.

8. The azo dye as claimed in claim 1, wherein $R^3$ is hydrogen, methoxy or ethoxy.

9. The azo dye as claimed in claim 1, wherein $R^4$ and $R^5$ are each $C_4$–$C_8$-alkyl, cyanoethyl or $C_3$–$C_4$-alkenyl.

10. A method of dyeing or printing synthetic materials comprising applying thereto an azo dye of claim 1.

* * * * *